United States Patent [19]

Murray et al.

[11] Patent Number: 6,052,402
[45] Date of Patent: Apr. 18, 2000

[54] LASER HAVING AN ELECTRODE ASSEMBLY INCLUDING ARC SUPPRESSION MEANS

[75] Inventors: Michael W. Murray, Palm City; Kevin M. Dickenson, Jupiter, both of Fla.

[73] Assignee: Argus Photonics Group, Inc., Jupiter, Fla.

[21] Appl. No.: 09/056,750

[22] Filed: Apr. 8, 1998

[51] Int. Cl.$^7$ .................................................. H01S 3/097
[52] U.S. Cl. ............................................................ 372/87
[58] Field of Search ........................................ 372/86, 87

[56] References Cited

U.S. PATENT DOCUMENTS

| | | |
|---|---|---|
| 3,743,881 | 7/1973 | Blaszuk . |
| 3,986,139 | 10/1976 | Meneely et al. . |
| 4,166,986 | 9/1979 | Hundstad et al. . |
| 4,905,251 | 2/1990 | von Dadelszen . |
| 5,067,135 | 11/1991 | Perzl et al. . |
| 5,247,531 | 9/1993 | Müller-Horsche . |
| 5,317,574 | 5/1994 | Wang ........................................ 372/87 |
| 5,434,881 | 7/1995 | Welsch et al. ............................ 372/87 |

*Primary Examiner*—Rodney Bovernick
*Assistant Examiner*—Robert E. Wise
*Attorney, Agent, or Firm*—Michael D. Rechtin; Foley & Lardner

[57] ABSTRACT

A laser having an electrode assembly which reduces the formation of glow-to-arc transitions. The electrode assembly of the present invention includes a cathode sub-assembly placed in opposition to an anode sub-assembly, with a main discharge region defined between the two. The cathode assembly includes an electrode in electrical contact with a cathode plate, the latter of which is formed from negative temperature coefficient of resistivity (NTC) material. The anode assembly includes an anode to which is mounted at least one structural member, at a position away from the main discharge region. This structural member is separated from the edges of the cathode plate by a gap, across which arcs may form.

16 Claims, 9 Drawing Sheets

LASER HAVING AN ELECTRODE ASSEMBLY INCLUDING ARC SUPPRESSION MEANS

TECHNICAL FIELD OF THE INVENTION

The present invention relates to transverse excitation or transverse excitation atmospheric lasers, and, more particularly, to an electrode assembly used within such lasers that is capable of suppressing glow-to-arc transitions.

BACKGROUND OF THE INVENTION

A transverse excitation (TE) or transverse excitation atmospheric laser is a gas discharge laser with transverse excitation of the laser gas. The first TE lasers were first built in the early 1970's and consisted of arrays of resistively ballasted metal pins arranged in rows extending along the length of an optical resonator. They were direct current (DC) discharge devices that required excitation pulses to be restricted to very short periods of time, typically a few microseconds. The duration of excitation pulses was limited because the large volume glow discharge conditions that existed at the beginning of an excitation pulse would constrict and develop into arc discharges after only a few microseconds.

Unlike glow discharges, arc discharges fail to pump the entire volume of the laser, and cause distortions and power fluctuations in the output beam. Traditionally, these problems were minimized by turning off excitation pulses before "glow-to-arc transitions" could occur. Another way by which the formation of arc discharges was kept to a minimum was by limiting the pressure of the laser gain medium. The natural consequence of this limitation, however, is a limitation of laser output power.

The primary challenge concerning the improvement of TE lasers has thus been the production of large volume, long duration, glow discharges in the highest pressure laser mixtures while minimizing the occurrence of glow-to-arc transitions. Because there are numerous factors that affect the frequency and severity of glow-to-arc transitions, this challenge has been a difficult one.

Parameters affecting the laser discharge include the electric field distribution in the discharge space, free electron distribution within the laser gas mixture in the discharge volume, the electrode surface conditions, and the gas temperature distribution in the discharge volume. The primary objective for the production of large volume glow discharges has been to ensure the uniformity of each of these parameters.

Arc discharges tend to form within the laser discharge volume at locations in which the plasma distribution is not uniform. Such non-uniformity is more likely to occur when the electric field applied to the discharge volume is not uniform. The plasma/electric field interaction is not one-way, however: plasma non-uniformity at one location can grow, concentrate, and eventually distort the electric field around it. This interaction between the applied electric field and the plasma can lead to the collapse of the volume glow discharge into an arc discharge. After some investigation, it was found that the frequency of such glow-to-arc transitions could be diminished by the use of profiled electrodes, instead of the arrays of pins used in the first TE lasers.

Profiled electrodes were designed to produce a large volume discharge with a uniform electric field. They were designed to minimize distortion of the electric field in the discharge volume due to the effects of the fringing fields that exist at the finite boundaries of the electrodes. The most commonly used electrode profile is known as the Rogowski profile.

The increased discharge uniformity offered by profiled electrodes comes at a cost. The electrodes are expensive to manufacture, and yet, like conventional electrodes, suffer damage when arc discharges occasionally form. Furthermore, profiled electrodes, alone, do not prevent arc formation.

Arc formation still occurs because when a voltage pulse is applied, glow discharges do not naturally form throughout the discharge volume even between two profiled electrodes. Typically, a free electron will induce a breakdown at one location within the discharge volume which quickly degenerates into an arc discharge.

To further prevent such arcs from developing, volume pre-ionization may be used. Pre-ionization occurs, for example, when radiation such as ultraviolet (UV) light is used to ionize gas throughout the glow discharge volume prior to application of the electric field. In effect, pre-ionization uniformly fills the entire volume between the profiled electrodes with free electrons so that no one particular electron has an opportunity to produce an arc discharge.

Although the generation of pre-ionization radiation typically requires radiation sources and additional electronics that increases the laser's cost, the combination of pre-ionization and profiled electrodes can significantly reduce arc discharge formation. But the combination fails to entirely prevent it. Consequently, other factors which affect the glow-to-arc transitions must be addressed.

One such factor is the uniformity of the surface conditions on the profiled electrodes, particularly the cathode electrode. Since TE lasers are DC discharge devices, the secondary emission properties of the cathode have an influence on the current distribution flowing through the glow discharge volume. If a particular spot on the cathode surface favors the enhanced conduction of discharge current, then the discharge will tend to concentrate at that spot, and in turn, the electric field will become distorted and a glow-to-arc transition will form.

The enhanced conduction at one particular spot may be caused from any anomaly on the surface of the electrode. The anomaly on the electrode surface may be caused by, for example, dust or oxidation.

The enhanced conduction at any particular spot caused by an anomaly on the electrode surface modifies the electric field within the laser's main discharge region, and leads to a glow-to-arc transition.

Therefore, the surfaces of the profiled electrodes must be polished, cleaned, free from anomalies, and conditioned by operating the electrodes at reduced pulse energy levels until the electrodes operate without developing the arcs.

Another factor that affects the surface conditions of the TE laser electrodes is the ability of the electrode material to resist the formation of hot spots as a result of the arcs. Arcs have the capability to concentrate enough energy in one particular spot on an electrode surface to pit the surface. The resulting electric field is non-uniform in the region of the pit, and leads to additional arcing at the same location, perpetuating the arcing problem. The severity of the problem increases with the laser's repetition rate, but is present even at rates as low as 1 Hertz (Hz). Therefore, the profiled TE laser electrodes not only have to be polished extensively, but must be made from a high temperature metal or material, such as nickel or stainless steel, that will resist arc surface damage.

Yet another factor that can lead to a glow-to-arc transition in a TE laser is non-uniform heating of the laser gas. As the temperature in a particular region in the laser gas is raised in relation to the surrounding regions, the relative ionization rate in that region will increase, and as a result, the discharge will become non-uniform.

As described above, once a discharge non-uniformity is established, the electric field becomes increasingly distorted and the glow-to-arc transition process rapidly occurs.

To overcome discharge non-uniformity due to increases in the temperature, a technique was developed of rapidly flowing the laser gas through the space between the profiled electrodes in a direction transverse to the optic axis of the laser. This technique allowed TE lasers to operate at pulse repetition rates of thousands of Hertz.

The methods of suppressing the glow-to-arc transition process described above were successful to the extent that the need for ballast resistors in the circuit of TE lasers no longer existed. As stated above, the early TE lasers used an array of resistively ballasted metal electrode pins. The ballast resistors attempted to uniformly distribute the current between the electrode pins, but resulted in a lack of discharge uniformity that prevented efficient laser operation.

The above described methods are expensive, and a TE laser capable of suppressing most glow-to-arc transitions must employ all of them. Consequently, what is needed is a low cost TE laser capable of suppressing glow-to-arc transitions.

Prior U.S. patents have addressed the issue of overcoming the problems of creating a uniform discharge in a TE laser. For example, U.S. Pat. No. 3,986,139 discloses a TE laser that incorporates a radioactive source to provide a partial ionization of the gas medium in the electrode area to provide a uniform pre-ionization.

U.S. Pat. No. 4,905,251 discloses a TE laser utilizing a resistive electrode assembly with pre-ionization; however, the patent does not adequately disclose how the resistive electrode is made. The suggested chemically inert semiconductor material suitable for a sealed laser is not commercially available and generally does not exist.

Barium titanite, uniformly doped, and formed in large sheets, is not commercially available and, assuming it is possible to fabricate, would be a very expensive electrode material and therefore cost prohibitive.

U.S. Pat. No. 3,743,881 discloses a laser utilizing a bulk material with a resistivity to compensate for changes in electrical potential in response to a change in current density; however, the patent does not address other factors that initiate the glow-to-arc transition, such as maintaining uniformity of the applied electric field.

U.S. Pat. No. 4,166,986 discloses a laser utilizing a plurality of individual ballast resistors; however, the array of pins creates local distortions of the electric field, which is followed by a glow-to-arc transition.

One of the primary concerns in fabricating a resistive electrode in a sealed TE laser is the choice of material for the resistive electrode, which most often chemically reacts with the laser gas. The chemical reaction between the resistive electrode and the laser gas changes the laser gas composition, and as a result, the laser gas becomes ineffective as a laser gain medium.

The selection of resistive electrode material for profiled metal electrode TE lasers is limited by surface properties of the electrode material. The resistive electrode material should have uniform secondary emission properties to avoid hot spots on the cathode, such as the hot spots that are clearly visible in the discharge photographs shown in T. A. Johns and J. A. Nation, A Resistive Electrode, High Energy, Transverse Laser Discharge, Rev. Sci. Instrum., Vol. 44, No. 2, Pg. 169.

What is needed is a low-cost TE laser capable of suppressing glow-to-arc discharges.

SUMMARY OF THE INVENTION

The present invention relates to an electrode assembly for a laser, especially a transverse excitation laser. The assembly includes a cathode sub-assembly and an anode sub-assembly, and provides an uniform laser discharge. The cathode sub-assembly generally has a cathode plate made of layer of negative temperature coefficient (NTC) of resistivity material, the resistivity of which decreases as its temperature increases. The cathode sub-assembly also has a metal electrode in electrical contact with the cathode plate. Preferably, the electrical contact between metal electrode and the cathode plate may be improved by covering all or part of the surface of the cathode plate adjacent to the metal electrode with a metalized coating.

The cathode plate may be provided with longitudinal sides parallel to the optic axis of the laser, and transverse sides perpendicular to the optic axis. The underside of the cathode plate forms the top of the main discharge region of the TE laser of the present invention.

The anode sub-assembly of the electrode assembly of the present invention also may include an anode plate and conductive side plates. The conductive side plates are preferably held close enough to the longitudinal edges of the cathode plate of the cathode sub-assembly that arcs can form between the plates and the cathode plate during laser operation. These arcs emit radiation that ionizes the laser medium before the glow discharge current travels through it. This inhibits the formation of glow-to-arc transitions. Although the conductive side plates may be permanently affixed, or a part of, the anode plate, it is preferred that they be held in mounting assemblies attached to, and electrically common with, the base plate. This facilitates their alignment with the cathode plate during assembly of the laser.

The anode sub-assembly may also include conductive end plates, which are preferably held adjacent to, and slightly above, the transverse edge of the cathode plate of the cathode sub-assembly. Although the end plates may be permanently affixed, or a part of, the anode plate, it is preferred that they too be held in mounting assemblies attached to, and electrically common with, the base plate. This facilitates their alignment with the cathode plate during assembly of the laser. The end plates are positioned close enough to the transverse edge of the cathode plate so that current can flow between them and the cathode plate, drawing any arcs that may form along the transverse edges of the cathode plate away from the path of the laser beam.

When the electrode assembly of the present invention is used within a pulsed laser operating at repetition rates greater than about 20 Hz, or operating as a continuous wave (CW) laser, it is preferred that the simple cathode plate of the cathode sub-assembly described above be replaced with a temperature compensated layered electrode.

The temperature compensated layered electrode of the present invention includes a layer of NTC material and a layer of positive temperature coefficient (PTC) of resistivity material. The net effect of the PTC and NTC properties favors the PTC material so that the overall layered electrode behaves as a single, PTC material. Consequently, as current flows through the layered electrode, its net resistivity will increase as its temperature increases.

DESCRIPTION OF THE PREFERRED EMBODIMENTS

The contents of commonly-owned U.S. Pat. No. 5,740,195 are incorporated by reference, to the extent necessary to understand the present invention.

As used herein, the term "transverse excitation laser" means a laser that may be characterized as either a transverse excitation laser or a transverse excitation atmospheric laser.

As used herein, the term "main discharge region" means that region of a transverse excitation laser that contains the lasing medium.

As used herein, the term "electrode assembly" means any portion of a transverse excitation laser through which current used to excite a lasing medium is passed, including the main discharge region. The term also includes those portions of a transverse excitation laser that affect the temperature or energetic state of the lasing medium in any way.

As used herein, the term "cathode sub-assembly" means any portion of the electrode assembly that, during laser operation, is held at approximately the same electronic potential as the cathode of the electrode assembly.

As used herein, the term "anode sub-assembly" means any portion of the electrode assembly that, during laser operation, is held at approximately the same electronic potential as the anode of the electrode assembly.

Although the terms "cathode" and "anode" are conventionally associated with the polarity of an applied voltage, as used herein these terms do not necessitate a particular polarity. In the present disclosure, these terms simply refer to two electrodes between which a voltage difference is applied. This voltage difference may be of any polarity, including a varying polarity, such as one in which an alternating current is applied to the two electrodes.

As used herein, the terms "conductive end plate" or "end plate" mean a part of an anode sub-assembly that is positioned above the plane formed by the top of an electrode assembly's main discharge region, or below the plane formed by the bottom of an electrode assembly's main discharge region, and close enough to a part of a cathode sub-assembly so that arcs can form between said parts during laser operation.

Figure 1:
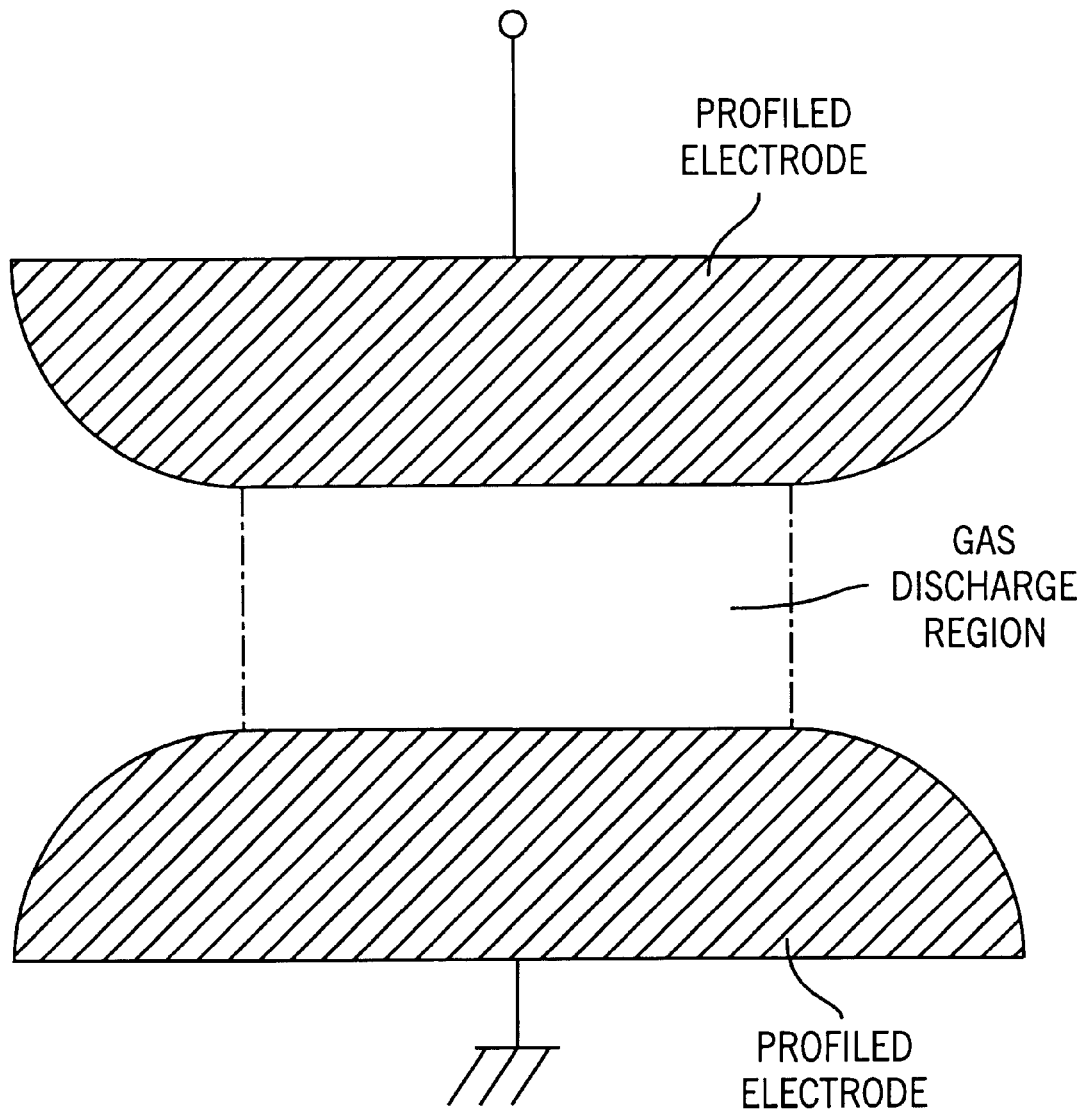
FIG. 1 is a cross-sectional view looking down the optic axis of an electrode assembly of the prior art.

As used herein, the term "pre-ionization structure" means a part of an anode sub-assembly that is positioned below the plane formed by the top of an electrode assembly's main discharge region, or above the plane formed by the bottom of an electrode assembly's main discharge region, and close enough to a part of a cathode sub-assembly so that arcs can form between said parts during laser operation. FIG. 1 shows the profiled electrodes used in the electrode assemblies of prior art TE lasers. These profiled electrodes have large radii of curvature at their edges, and are consequently large in size. By contrast, the electrode assembly of the present invention does not utilize such bulky electrodes, and so allows the construction of lasers that are more compact than those of the prior art.

The electrode assembly of this invention may be used within continuous wave (CW) lasers, low repetition rate pulsed lasers operating at rates less than about 5 Hertz (Hz), medium repetition rate lasers operating at rates between about 5 Hz and about 20 Hz, and high repetition rate lasers operating at rates greater than about 20 Hz. The electrode assembly promotes uniform laser discharge in whatever type of TE laser the present invention is used by employing at least one of several glow-to-arc transition suppression means. These include, but are not limited to: 1) maintaining a uniform electric field within the main discharge area of the laser; 2) pre-ionizing the gas within the main discharge area; and 3) limiting temperature-induced changes in the resistivity of the electrode assembly.

Figure 2:
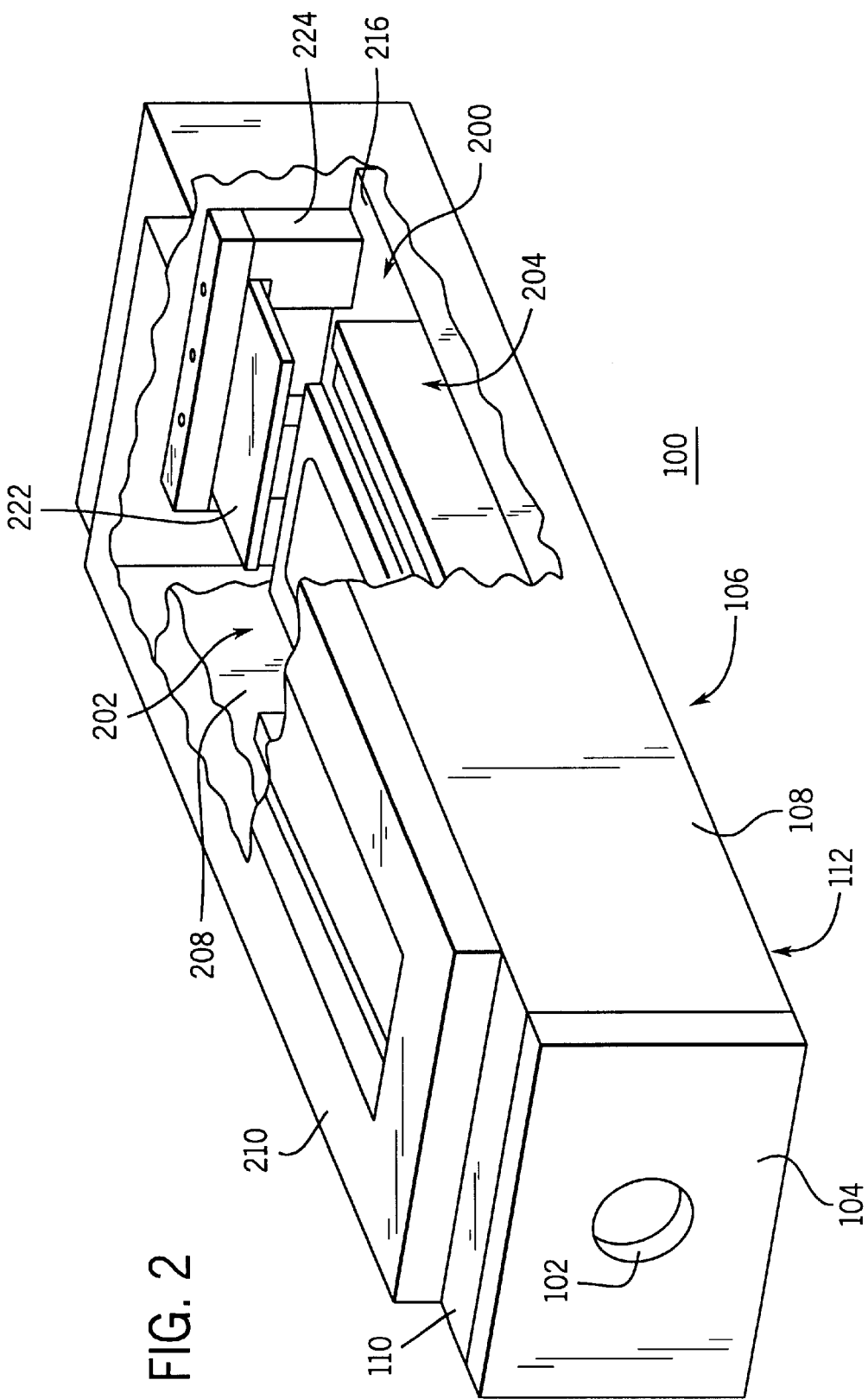
FIG. 2 is a perspective view of a TE laser cutaway to reveal an electrode assembly of the present invention.

FIG. 2 shows a TE laser 100 incorporating a first embodiment 200 of the electrode assembly of the present invention. The laser, which may be used either as an oscillator or an amplifier, comprises an aperture 102 in a face plate 104, through which the laser beam is emitted. The face plate 104 is attached to the frame 106 of the laser 100, which comprises transverse sides 108, a top side 110, and a bottom side 112. The top side 110 of the laser 100 is typically covered with a top cover 210. In FIG. 2, a side 108, the top side 110, and the top cover 210 of the laser 100 are cut-away to reveal a first embodiment 200 of the electrode assembly of the present invention.

The embodiment 200 of the electrode assembly is suitable for use in low repetition rate TE lasers, wherein the formation of glow-to-arc transitions due to localized heating of the electrodes is infrequent. The embodiment 200 comprises a cathode sub-assembly 202 and an anode sub-assembly 204. The anode sub-assembly 204 comprises an anode plate 216 and conductive end plates 222 held in conductive mounts 224. In this embodiment, the cathode sub-assembly 202 is suspended from the top cover 210 of the laser 100 by supports 208. The anode sub-assembly 204 is mounted on the bottom side 112 of the frame 106 of the laser 100.

Figure 3:
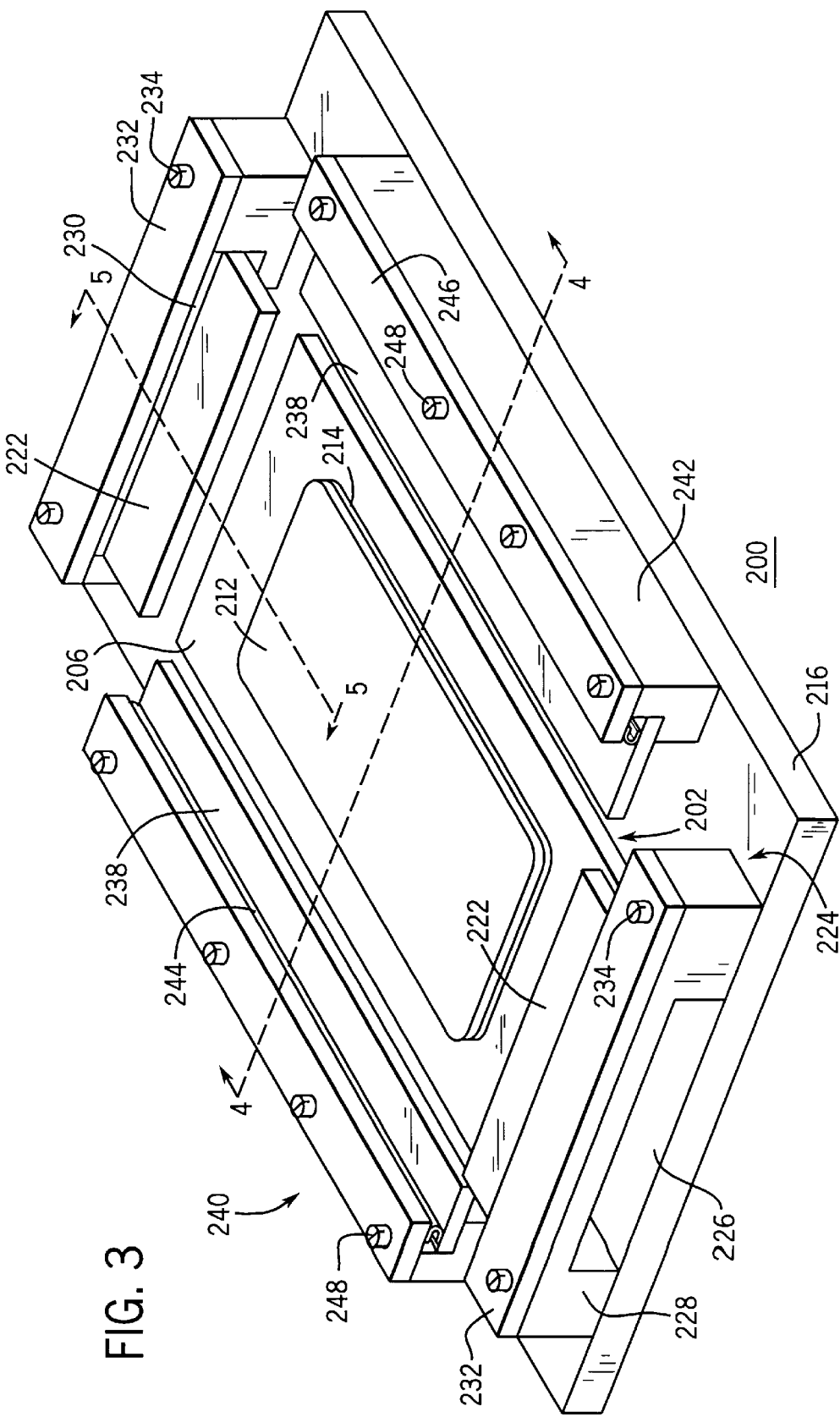
FIG. 3 is a perspective view of a first embodiment of the electrode assembly of the present invention.

FIG. 3 shows a profile view of the first embodiment 200 of the electrode assembly of the present invention. As shown, the cathode sub-assembly 202 consists of an electrode 212 and a cathode plate 206 made of a material which typically has a negative temperature coefficient (NTC) of resistivity. Because the resistivity of NTC materials decreases with increasing temperature, they generally are not desirable as electrode materials because the localized electrode hot spots that often form during laser operation will lead to increased localized current flow, which in turn can cause arcing within the electrode assembly 200. This is typically not a problem that occurs in low repetition rate lasers, however. Furthermore, few materials with positive temperature coefficient (PTC) of resistivity possess the characteristics necessary for use in the cathode sub-assembly 202. These characteristics typically include low cost, resistance to corrosion and high temperatures, and an impermeability to gases such as helium.

Figure 4:
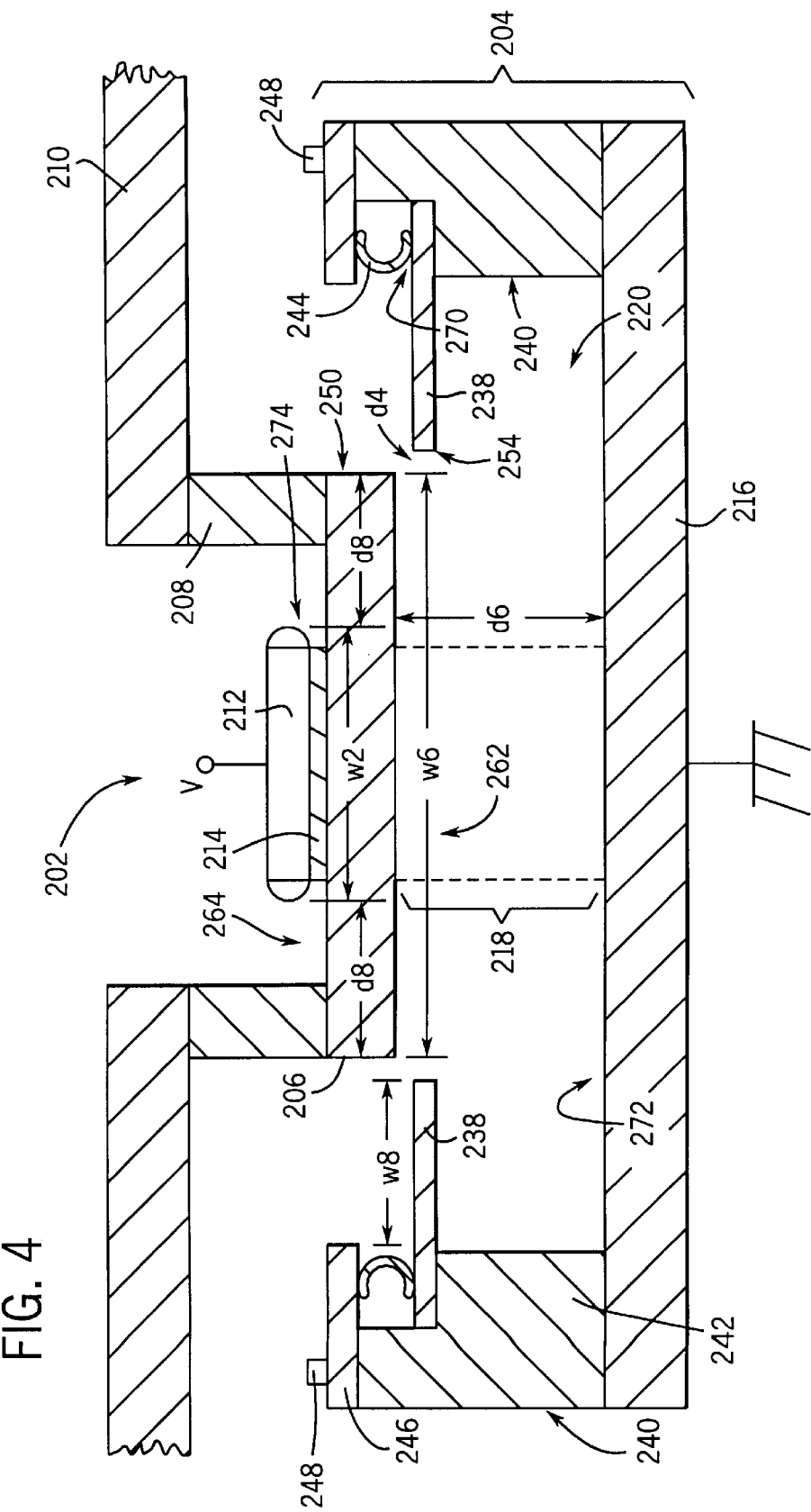
FIG. 4 is a view of the cross section 4—4 of FIG. 3, looking down the optic axis of the electrode assembly.

FIG. 4 shows the cross section 4—4 of the embodiment shown in FIG. 3. As shown, the cathode plate 206, which is made of NTC material, is in direct contact with the lasing medium 220, which is typically a gas. The cathode plate 206 is preferably formed from a large area, continuous sheet of NTC material.

When the lasing medium 220 is $CO_2$, the preferred NTC material is silicon with a resistivity in the range of about 20 to 200 Ohm-cm. When the lasing medium 220 contains fluorine, as in the case of excimer lasers, it is preferred that the cathode plate 206 be made of silicon carbide with a resistivity in the range of about 1 to 10 Ohm-cm.

Although it is preferred that the cathode plate 206 be made from silicon or silicon carbide, those skilled in the art will recognize that it may also be made from other materials. Suitable materials must be capable of withstanding high temperatures, must be impermeable to helium, and must be chemically inert to the other gases used within the laser. Ideally, the cathode plate 206 is made from large, structurally strong, sheets of a material able to withstand pressures of at least 14.7 pounds per square inch (psi).

The top side 264 of the cathode plate 206 of the cathode sub-assembly 202 is preferably coated with a metalized layer 214 which improves the electrical contact between the cathode plate 206 and the electrode 212. The metalized layer 214 between the cathode plate 206 and the electrode 212 is used because the surfaces of most useful NTC materials form electrically resistive oxide coatings. These coatings restrict the current flow between the electrode 212 and the cathode plate 206 to a few localized points, and cause glow-to-arc transitions. The cathode plate 206 may be metalized by one or more techniques known to those skilled in the art. These include, but are not limited to, sputter coating, evaporative coating, electro-plating, chemical deposition, and painting with organo-metallic or conductive paints.

The cathode plate 206 preferably has a thickness ranging from about 0.05 to 0.15 inches. The precise thickness of the cathode plate 206 will be determined by the desired voltage drop across the cathode sub-assembly 202, as described in the aforementioned patent. It is preferred that the voltage drop across the cathode sub-assembly 202 be in the range of about 5 to 20 percent of the voltage drop across the entire laser. The percentage can be controlled by adjusting the product of the bulk resistivity of the material from which the cathode plate 206 is made and the thickness of the cathode plate 206. In the case of an atmospheric pressure $CO_2$ laser with a 1 centimeter discharge gap d6 between the bottom 262 of the cathode plate 206 and the top 272 of the anode plate 216, it is preferred that 0.1 inch-thick silicon with a bulk resistivity on the order of 20–200 Ohm-cm be used.

The cathode plate 206 has a width w6 and the electrode 212 has a smaller width, designated by w2. As shown in FIG. 4, the electrode 212 is centered widthwise atop the cathode plate 206. The cathode plate width w6 exceeds the elected width w2 by a distance d8 on either side of the electrode 212. This distance d8 extends from longitudinal edge 274 of the electrode 212 to the longitudinal edge 250 of the cathode plate 206, on either side of the electrode 212. In an embodiment reduced to practice in accordance with FIG. 4, w6 is 3.25 in., w2 is 0.4 in. and d8 is 1.425 in. However, the exact magnitudes of these dimensions are not critical, for reasons discussed below.

In the embodiment of FIG. 4, conductive side plates 238 are provided on either side of the cathode plate 206. The conductive side plates 238, which are electrically in common with the anode 216, are held in place by mounts 240. The conductive side plates 238 extend substantially along the longitudinal length of the cathode plate 206. The longitudinal edges 254 of the conductive side plates 238 are held parallel to the longitudinal edge 250 of the cathode plate 206 and are spaced apart therefrom by an arc gap d4.

The arc gap d4 is substantially the same along the entire length of the opposing respective longitudinal edges 250, 254. The size of the gap d4 between the longitudinal edges 250 of the cathode plate 206 and the longitudinal edges 254 of conductive side plates 238 is on the order of 0.05–0.15 inches. The conductive side plates 238 are the same length as the cathode plate 206, and typically have a thickness on the order of 0.05–0.1 inches. The effective width w8 of the conductive side plates 238, defined as the distance from the latters' longitudinal edge 254 to the point 270 at which the conductive side plate make electrical contact with the mount 240, is approximately 0.5–1.0 inch.

The conductive side plates 238 are preferably held in place with fingerstock 244. The fingerstock 244 is compressed by top plates 246 screwed onto mount supports 242, upon which the conductive side plates 238 sit. Screws 248 hold the top plates 246 in place. These screws can travel through the mount supports 242 and into the base plate 216 of the anode sub-assembly 204. It is preferred, however, that separate screws be used to attach the mounts 240 to the anode plate 216.

It is preferred that fingerstock 244 be used to hold the conductive side plates 238 in place instead of conventional bolts or clamps. This is because fingerstock improves the electrical contact between the plates 238 and the mounts 240 while clamping the plates 238 in place without placing excessive mechanical force upon them in any one place. This is especially desirable if the conductive side plates 238 are made of brittle materials such as silicon or silicon carbide.

Other means may be used to improve the electrical contact between the conductive side plates 238 and the mounts 240. For example, the contact surfaces of the conductive side plates 238, the fingerstock 244, the mount top plates 246, or the mount supports 242 may be metalized. It is also possible to replace the fingerstock 244 with indium ribbons. When indium ribbons are compressed by tightening the screws 248 that hold the mounts 240 in place, the indium bonds to any metalization on the conductive side plates 238, the mount supports 242, and the top plates 246. When the ribbons are compressed, the indium also tends to spread out so that a uniform mechanical load is maintained on the conductive side plates.

The conductive side plates 238 of the anode sub-assembly 204 are preferably made of the same material from which the cathode plate 206 of the cathode sub-assembly 202 is made. The plates 238 may, however, be made from any conductive material that is capable of withstanding high temperatures and is chemically inert to gases used within the laser. These include silicon, silicon carbide, barium titanate, germanium, and other semiconductor materials.

The conductive side plate mounts 240 are preferably made from aluminum when the present invention is used as a $CO_2$ laser. The mounts 240 may be made from other materials as well, such as stainless steel, gold-plated beryllium-copper, and silicon carbide. The fingerstock 244 is preferably made of gold-plated beryllium-copper.

During operation of a laser incorporating the embodiment of FIG. 4, a first electric field is formed in the main discharge region 218. The magnitude of this first electric field is approximately the ratio of the voltage applied to the electrode 212 to the discharge gap d6. A second electric field is formed immediately below the bottom surface 262 of the cathode plate 206 on each side of the main discharge region 216. The magnitude of this second electric field is approximately the ratio of the voltage applied to the electrode 212 to the combined distance (d8+w8). This combined distance is approximately the physical distance between the edge 274 of the electrode 212 and the point 270 at which the conductive side plate 238 makes electrical contact with the mount 240. The first electric field should be greater than the second electric field. Otherwise, the gas will ionize just under the bottom surface 262 of the cathode plate 206 and arcs will travel horizontally along the underside of the cathode plate, thereby degrading laser performance. Therefore, it is preferable that d6<(d8+w8). It can readily be seen, then, that the present invention provides some flexibility with respect to the selection of w2, d6, d8 and w8.

The use of conductive side plates 238 yields a number of advantages. One advantage is that they effectively cause the cathode plate 206 to function as if it were much wider than just w6, due to the added effective width w8. This eliminates the need for wider, more costly, NTC plates.

Another advantage provided by the conductive side plates is the proximity of the gaps d4 to the main discharge region 218. When a TE laser using an electrode assembly of the present invention is operated, the gaps d4 fill with small arcs. These arcs emit UV radiation which radiates into the main discharge region 218 of the assembly, and pre-ionize the laser medium 220 therein. Because of the proximity of the sparks to the main discharge region 218, they provide greater amounts of UV radiation than would otherwise be possible.

Yet another advantage of the conductive side plates 238 is that they also help improve the uniformity of the electric field at the longitudinal edges 250 of the cathode plate 206. This uniformity diminishes the formation of glow-to-arc transitions within the main discharge region 218. If the electrode assembly is used within CW TE lasers, wherein pre-ionization is not necessary, the use of conductive side plates 238 may thus still be desirable.

Pre-ionization is typically needed only for pulsed discharge TE lasers to bias the initial conditions in the main discharge region to produce a glow discharge throughout the region when a high voltage pulse is applied. The pre-ionization discharge has no influence on the discharge in the main discharge region after the main discharge has been established.

Figure 5:
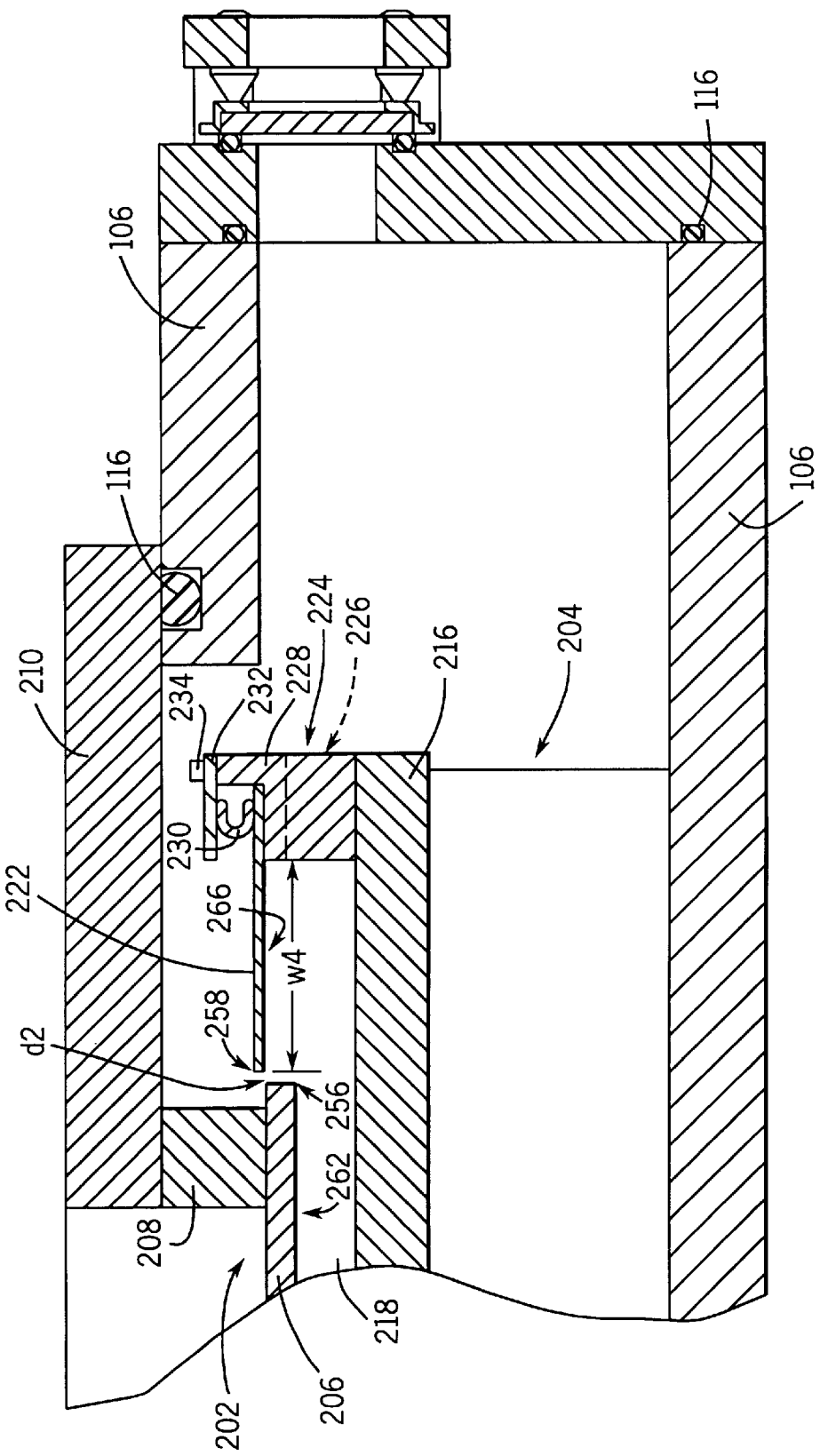
FIG. 5 is a view of the cross section 5—5 of FIG. 3, looking perpendicular to the optic axis of the electrode assembly, and in the context of the housing.

FIG. 5 shows a cutaway of the 5—5 cross section of FIG. 3. Also shown in FIG. 5 is a means by which the electrode assembly may be mounted within a TE laser. It is preferred that the cathode plate 206 of the cathode sub-assembly 202 be suspended above the anode plate 216 by a support 208 attached to an insulating cover 210 preferably made of glass, plastic or ceramic materials. The cover 210 is attached to the frame 106 of the TE laser, and an airtight seal between the cover 210 and the frame 106 is maintained with the aid of an O-ring 116, preferably made of an inert material such as Viton.

Any electrically non-conductive means known to those skilled in the art may be used to attach the cathode plate 206 to the supports 208. For example, the cathode plate 206 may be glued to the support 208, or mechanically clamped thereto with the aid of electrically non-conductive hardware. If glue is used, the glue must not react chemically with the laser gas or introduce chemical contaminants into the laser gas. Furthermore, the glue joint locations must not allow contact between the glue and any ionized gas associated with a gas discharge. The use of glue is appropriate in laser designs in which the cathode plate 206 is used to form part of a gas tight containment vessel for the laser gas.

As shown in FIG. 5, the cathode plate 206 is part of the laser gas containment vessel. Thus, it separates the laser gas in main discharge region 218 from air on the top side of the cathode plate 206. As a result, any hardware provided to make electrical contact to the top side of the cathode plate (e.g., metalization materials, potting materials, etc.) will not contaminate the laser gas, as they are not in contact with the gas. It should be noted, however, that a laser may be constructed in accordance with the present invention wherein the cathode plate does not form part of the gas containment vessel, but instead is simply a structure housed within a such a vessel.

The anode sub-assembly 204 of the first embodiment of the electrode assembly also has conductive end plates 222. The end plates 222 are held parallel to, and slightly above, the transverse edge 256 of the cathode plate 206. The transverse edge 258 of the end plates 222 are separated from the transverse edge 256 of the cathode plate 206 by gaps d2. The end plates 222 are held parallel to the cathode plate 206 by mounts 224 that are attached to, and electrically common with, the base plate 216 of the anode sub-assembly 204.

The bottoms 266 of the conductive end plates 222 are typically about 0.05 to 0.125 inches above the bottom 262 of the cathode plate 206 of the cathode sub-assembly 202. The size of the gap d2 between the transverse edge 256 of the cathode plate 206 and the transverse edge 258 of the end plates 222 is approximately the same as dimension d4. The end plates 222 are preferably no thicker than the cathode plate 206 and the length of the end plates 222 is preferably the same as the width of the cathode plate 206. The effective width w4 of the conductive end plates 222 can be the same as the effective width w8 of the conductive side plates 238, to maintain symmetry. However, this is not an absolute necessity.

The conductive end plates 222 are preferably made of the same material from which the cathode plate 206 is made. The end plates 222 may, however, be made from any conductive material that is capable of withstanding high temperatures and is chemically inert to the gasses used within the laser.

When a high voltage pulse is applied to the cathode sub-assembly 202, the gaps between the transverse edge 256 of the cathode plate 206 and the transverse edge 258 of the end plates 222 fill with arcs. The end plates 222 provide paths through which current may flow to the anode plate 216. This lowers electric field distortions near the transverse edge 256 of the cathode plate 206 which promote glow-to-arc transitions in the main discharge region 218.

Because the bottoms 266 of the end plates 222 are positioned above the bottom 262 of the cathode plate 206, arcs that form in the gaps d2 are not in the path through which the laser beam travels. The arcs thus do not interfere with the uniformity of the laser beam.

If the conductive end plates 222 are not used, corona discharges occur at the transverse edge 256 of the cathode plate 206. These discharges form small arcs between the transverse side edge 256 and the anode plate 216 which can interfere with the spatial and power uniformity of the laser beam.

The conductive end plates 222 of the anode sub-assembly 204 also suppress glow-to-arc transitions by providing for a smooth, linear voltage transition upon application of voltage pulses to the cathode sub-assembly 202.

When voltage is applied to the cathode plate 206, current flows from its transverse edge 256 to the conductive end plates 222, through the end plate mounts 224 to the anode plate 216. After the pre-ionization current has begun to flow, a glow discharge forms in the main discharge region 218 between the cathode plate 206 and the anode plate 216. The glow discharge current flows through the narrow dimension of the cathode plate 206, which offers the path of least electrical resistance. But because some current flows through the conductive end plates 222, a smooth, linear voltage transition occurs upon application of the pulse. This minimizes the distortion of the electric field in the glow discharge, suppressing glow-to-arc transitions.

The conductive end plates 222 are held in mounts 224 that are similar in design to the conductive side plate mounting assemblies except that the end plate mount supports 228 contain apertures 226 through which the laser beam may pass unobstructed.

The conductive end plates are preferably held with fingerstock 230 compressed by top plates 232 screwed onto mount supports 228, although other connection means such as indium strips or metalization may be used. Screws 234 hold the top plates 232 in place. If desired, they can travel through the mount supports 228 and into the base plate 216 of the anode sub-assembly 204. It is preferred, however, that separate screws be used to attach the mount supports 228 to the anode plate 216.

Figure 6:
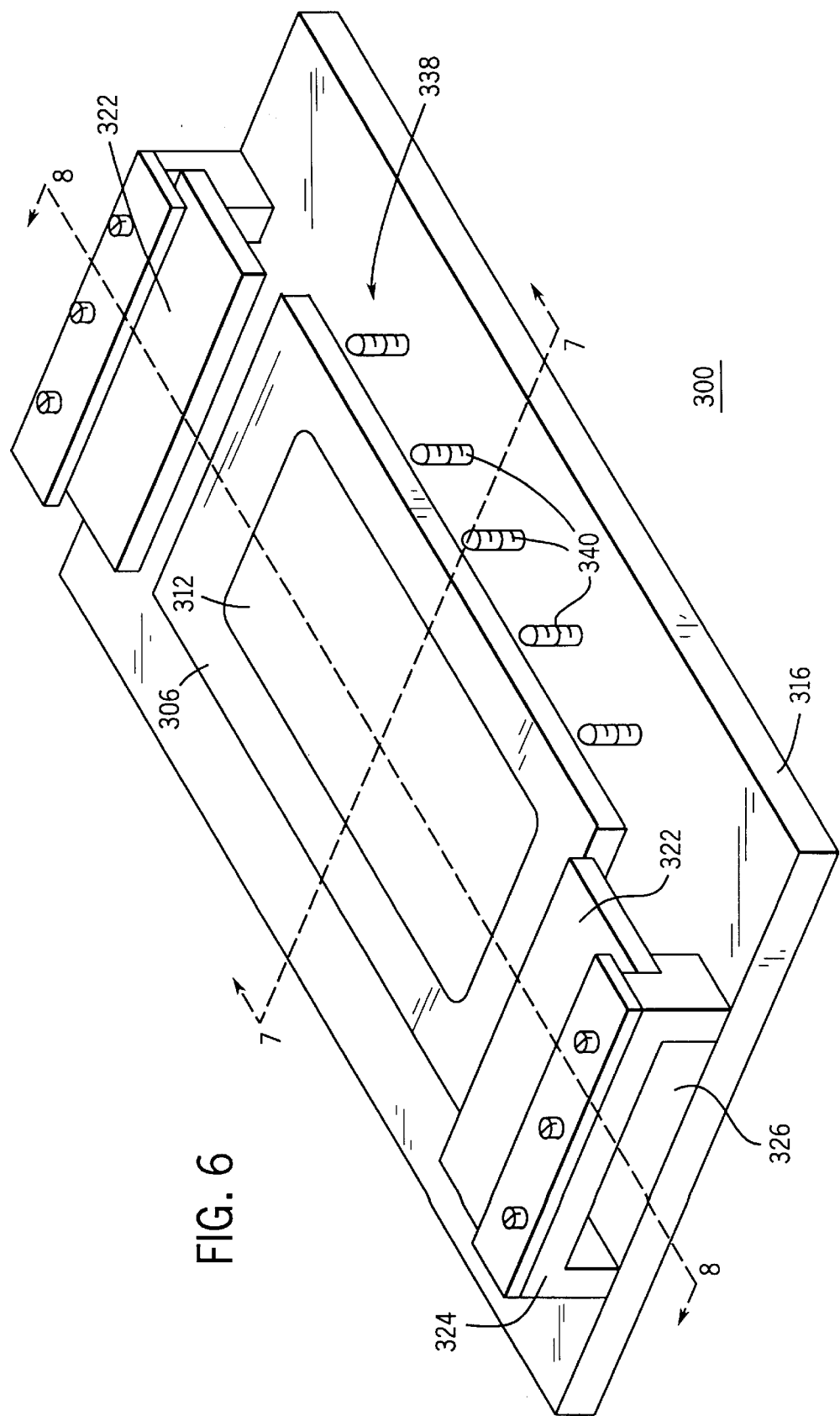
FIG. 6 is a perspective view of a second embodiment of the electrode assembly of the present invention.

FIG. 6 shows a perspective view of a second embodiment of the electrode assembly of the present invention. This second embodiment, which is suitable for use in low repetition rate pulsed TE lasers, pre-ionizes the laser gas with the aid of arrays 338 of pre-ionization rods 340.

Figure 7:
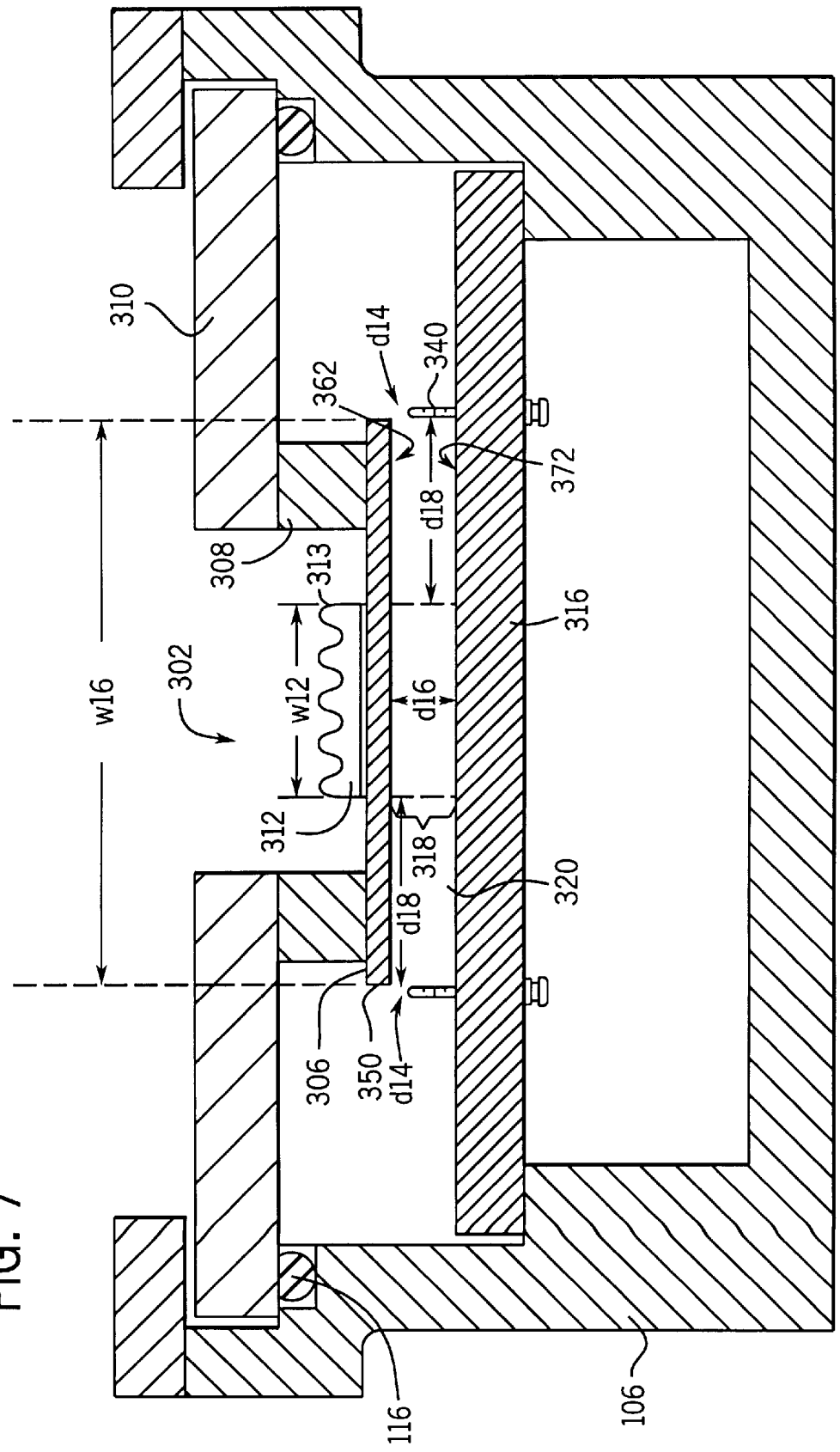
FIG. 7 is a view of the cross section 7—7 of FIG. 6, looking down the optic axis of the electrode assembly, and in the context of the housing.

FIG. 7 shows the 7—7 cross section of FIG. 6. As shown, the pre-ionization rods 340 are attached to, and electrically common with, the anode plate 316. The rods 340 are preferably positioned close to, and slightly below, the longitudinal edges 350 of the cathode plate 306.

The cathode plate 306 has a width w16 and the electrode 312 has a smaller width, designated by w12. As shown in FIG. 7, the electrode 312 is centered widthwise atop the cathode plate 306. The cathode plate width w16 exceeds the elected width w12 by a distance d18 on either side of the electrode 312. This distance d18 extends from the edge of the electrode 312 to the longitudinal edge 350 of the cathode plate 306, on either side of the electrode 312.

As stated above, the rods 340 are positioned in close proximity to longitudinal edge 350. Thus, the rods are approximately a distance d18 from the main discharge region. Therefore, unless dl8 exceeds discharge gap d16, arcing may occur along the bottom surface 362 of the cathode plate 306. Thus, the embodiment of FIGS. 6 and 7 does not benefit from the effective width of the conductive side plates 238 shown in the embodiment of FIGS. 3–5. However, the embodiment of FIGS. 6 and 7 has a simpler construction.

When a voltage pulse is applied to the cathode sub-assembly 302, pre-ionization current concentrates at each gap d14 between the longitudinal edges 350 of the cathode plate 306 and the rods 340. The resulting arcs emit UV radiation that pre-ionizes the laser medium 320 in the laser's main discharge region 318. Because fewer arcs are formed within the gaps d14 than are formed when conductive side plates are used, the arcs of this embodiment are typically brighter than those of the first embodiment and consequently pre-ionize more of the laser medium 320.

Increased ionization of the laser medium prior to glow discharge allows a higher energy input, and a greater laser discharge power, than is generally attainable with the use of resistive plate pre-ionization. A disadvantage, however, that accompanies the use of pre-ionization rods is the generation of distortions in the electric field within the main glow discharge region 318. Such distortion is not present when conductive side plates are used.

When this embodiment of the electrode assembly is used within a $CO_2$ laser, the size of gap d14 between the tops 344 of the rods 340 and the longitudinal edges 350 of the cathode plate 306 is on the order of about 0.1–0.3 inches. Although the size of the gap d14 may take on a range of values, the uniformity of the arcing across the gap d14 typically decreases as the size of the gap d14 increases beyond 0.3 inches. Furthermore, if the size of the gap d14 is much less than 0.1 inches, the current distribution among the individual rods 340 may be uneven.

Figure 8:
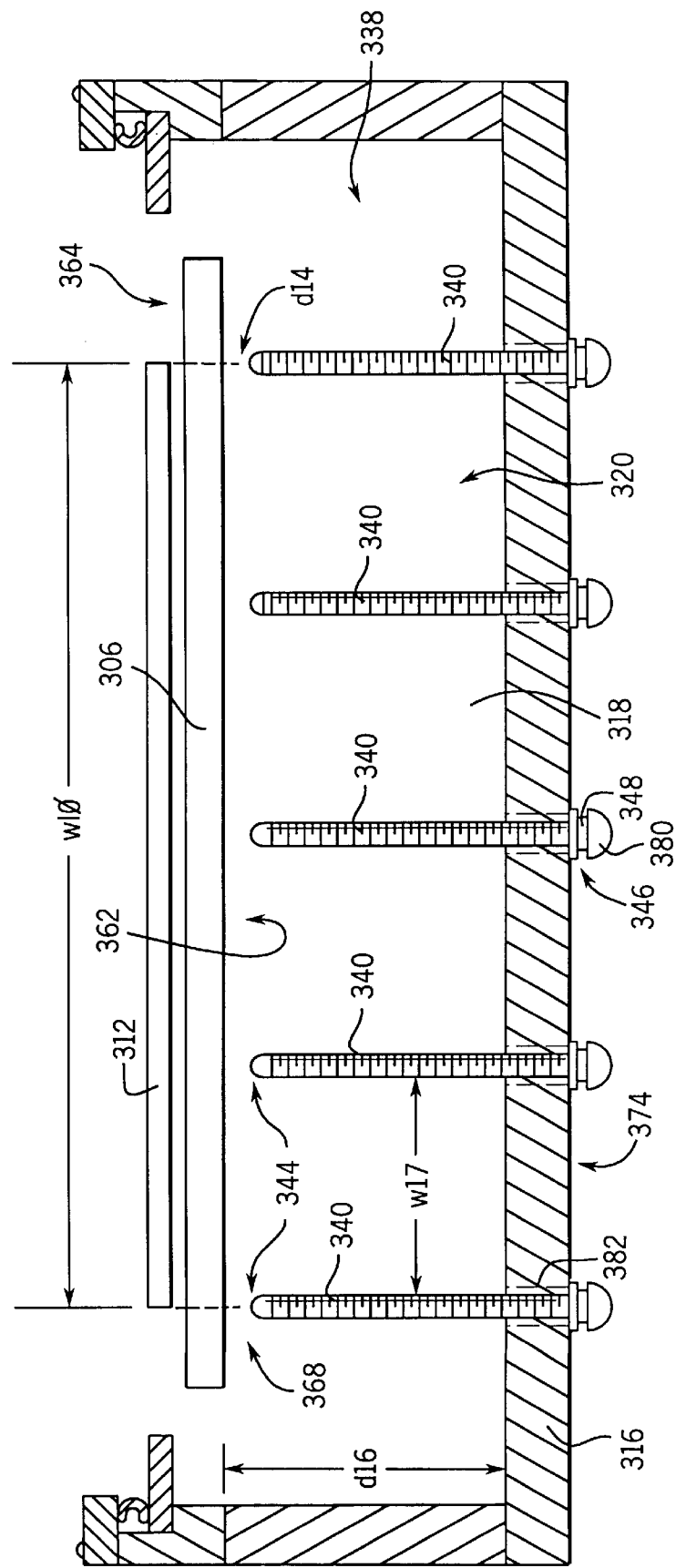
FIG. 8 is a view of the cross section 8—8 of FIG. 6, looking perpendicular to the optic axis of the electrode assembly.

FIG. 8 shows the 8—8 cross section of FIG. 6. As shown, the pre-ionization arrays 338 are mounted in, and perpendicular to, the base plate 316. The spacing w17 between the rods 340 is typically in the range of about 0.5 to about 1.0 inches, and the number of rods 340 in an array 338 is proportional to the length w10 of the discharge region 318. The rods 340 are preferably arranged such that the ends of the arrays 338 are aligned with the transverse edges 368 of the main discharge region 318.

Preferably, the rods 340 are made from screws, the tops 344 of which are hemispheric and identical to one another. This helps ensure uniform arcing among the rods 340. The rods 340 are preferably mounted in the anode plate 316 via threaded holes 382 tapped all the way through the anode plate 316. The heads 380 of the screws forming the rods 340 are preferably separated from the bottom 374 of the anode plate 316 by washers 346 and locking nuts 348, which facilitate the precise positioning and locking in place of the rods 340.

Although stainless steel screws are preferred, the pre-ionization rods 340 may be of any shape and may be made from any high melting point conductive material such as tungsten, molybdenum, or tungsten-copper alloy. In some cases, for example when the gases used in the TE laser are chemically active, the rods 340 are preferably made of dielectric material such as barium titanate or alumina ceramic.

When a dielectric material is used, the pre-ionization arcs that form in the gaps d14 tend to travel down the sides 384 of the rods 340 to the base plate 316 of the anode sub-assembly 304. These arcs typically travel down the sides 384 of the rods 340 closest to the main discharge region 318, further facilitating the pre-ionization of the laser medium 320. If arcing down the sides of the rods 340 is not desired, the rods 340 may be made of dielectric material and coated with an insulator such as glass or beryllium oxide ceramic. The insulation limits the current flowing through the rods 340 as they charge up. This helps suppress arcs that may form along the bottom surface 362 of the cathode plate 306, and allows for a slightly wider main discharge than is obtainable with non-insulated dielectric rods.

The first and second embodiments of the electrode assembly of the present invention are suitable for use in low repetition rate TE lasers, wherein heating of the cathode plate 306 is too little to lead to the formation of glow-to-arc discharges. However, these embodiments may be adapted for use in medium repetition rate TE lasers. One such adaptation is the attachment of heatsinks to the top 364 of the cathode plate 306. These, in combination with and fans, can dissipate excess heat formed by laser operation, and help inhibit the formation of glow-to-arc transitions. As heatsinks are likely to be formed of metal, and thus are good electrical conductors, the heatsink 313 will form part of the electrode 312, as shown in FIG. 7. Therefore, any such heatsinks preferably should not extend beyond the metalized region of the cathode plate. Other glow-to-arc suppression means may be employed by the electrode assembly of this invention, including the temperature compensated layered electrodes described in detail in the aforementioned commonly-owned patent.

Figure 9:
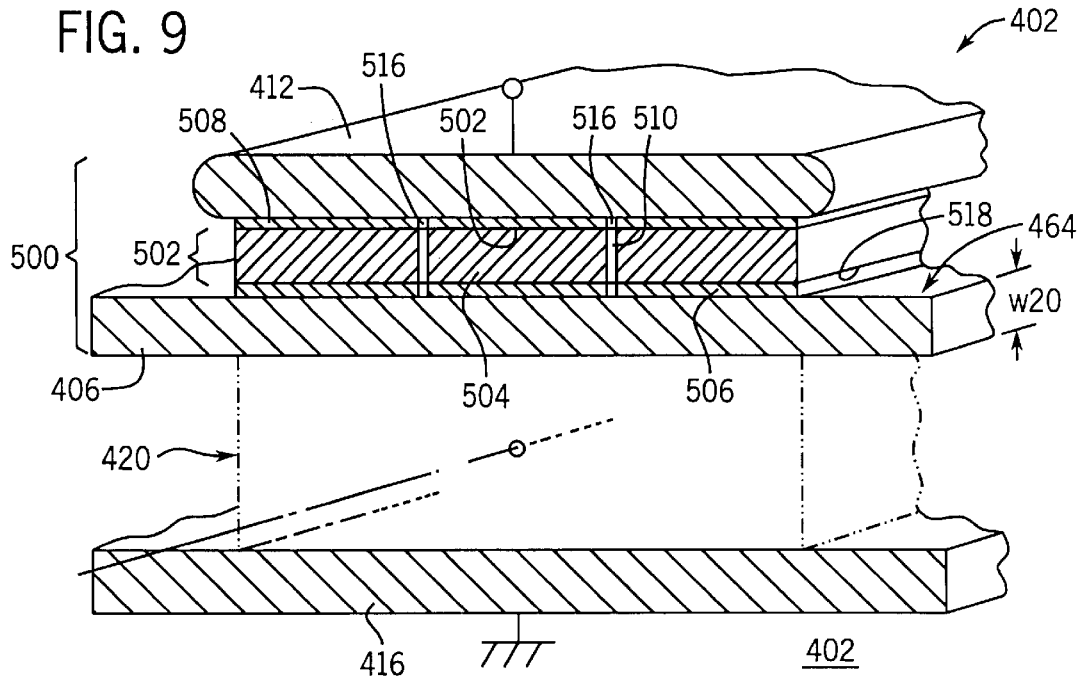
FIG. 9 is a perspective view of an embodiment of a temperature compensated layered electrode.

FIG. 9 shows a perspective of a cathode sub-assembly 402 comprising a temperature compensated layered electrode 500. By comprising such temperature compensated electrodes, the electrode assembly of the present invention may be used in CW and high repetition rate pulsed TE lasers.

Under high repetition rate or CW operating conditions, localized hot spots can develop in the cathode plate 406. Because the cathode plate is made of NTC material, the resistivity of which decreases with increasing temperature, the cathode plate 406, alone, is not desirable as an electrode material. This is because as a localized electrode hot spot develops, a glow-to-arc transition develops in the laser gas at a discrete location and the local electrode resistivity decreases. As a consequence, more current flows through the discharge at the electrode hot spot, leading to an arc discharge.

Unlike an NTC material that tends to promote the glow-to-arc transition process, a positive temperature coefficient (PTC) material will have the opposite affect on discharge uniformity. As a PTC resistive electrode increases in temperature at a localized, discrete, location, the resistivity will increase at the location and reduce the discharge current at that location. As a result of the PTC, the glow-to-arc transition process will be diminished or terminated. Thus, a PTC material is the best material to be used for a resistive electrode TE laser.

Most currently available PTC materials, however, have gas permeability and other limitations that do not allow their direct contact with the laser medium 420. However, as described here and in the aforementioned patent, it has been found that a layered electrode comprising NTC and PTC materials can have electrical properties similar to those of a PTC material. Such layered electrodes may be used in either the cathode sub-assembly or anode sub-assembly, or both, although it is preferable that only one be used in the cathode sub-assembly.

A variety of PTC materials may be used for the PTC layer, providing the PTC material is economical and has uniform electrical properties over the total area of the PTC material. One example of a PTC material that may be used in the resistive electrode assembly of the present invention is barium titanite doped with strontium. This material is commonly used in the production of thermistors.

FIG. 9 shows that the layered electrode 500 includes the cathode plate 406 and electrode 412 of the cathode sub-assembly 402, in addition to a PTC layer 502. The layer of PTC material 502 is adjacent to and located external of the cathode plate 406 and the laser medium 420 so that the PTC layer 502 is essentially sealed from the laser medium 420. The electrode 412 is located adjacent to, and external of, the PTC layer 502.

The PTC layer 502 need not be fabricated from a continuous sheet of PTC material. The PTC layer 502 may instead be fabricated from a plurality of PTC material tiles 504 arranged in a matrix configuration with the tiles being in close proximity to each other. A non-conductive potting material 510 fills the gaps 516 between the PTC tiles 504. It is preferred that the potting material be made of silicone rubber, such as RTV 11 manufactured by General Electric Co. Epoxy, or other materials known to those skilled in the art may also be used.

Depending upon the fabrication techniques and materials used, the cathode plate 406 may be in direct contact with the PTC layer 502, and the electrode 412 may be in direct contact with the PTC layer 502. It is preferred, however, that patches of metalization 506 cover the top 464 of the cathode plate 406 and the bottom 518 of the PTC layer 502. It is also preferred that the top 502 of the PTC layer 502 be metalized so that a layer of metalization 508 lies between the PTC layer 502 and the electrode 412.

Metalization is used because most PTC materials, like NTC materials, form electrically resistive oxide coatings. These coatings restrict the current flow at a non-metalized NTC/PTC interface such that good electrical contact forms at only a few locations. The PTC metalized coating 508 thus facilitates a uniform distribution of current throughout the PTC layer 502.

The metalization 506 on the top surface 464 of the cathode plate 406 and the bottom 518 of the PTC layer 502 is preferably in the form of isolated patches. This configuration prevents current from flowing any significant distance in the plane between the cathode plate 406 and the PTC layer 502, while providing a large number of low resistivity contact points between them.

Ideally, the metalization patches on the top surface 464 of the cathode plate 406 and the bottom surface 518 of the PTC layer should be as small and numerous as possible. There is, however, a practical limit to how fine the metalization pattern may be before fabrication and alignment become too expensive. But it is preferred that the patch size be small compared to the thickness of the NTC (cathode plate) and PTC substrates so that the electric current will tend to spread as it flows through the substrate, and merge with the current from adjacent patches. There should be enough patches to approximate an overall uniform distribution of current through the cathode plate 406 and into the laser medium 420. If the patch size is much larger than the thickness w20 of the cathode plate 406, the current may concentrate at one region of the patch where the substrate has slightly lower resistivity.

Figure 10A:
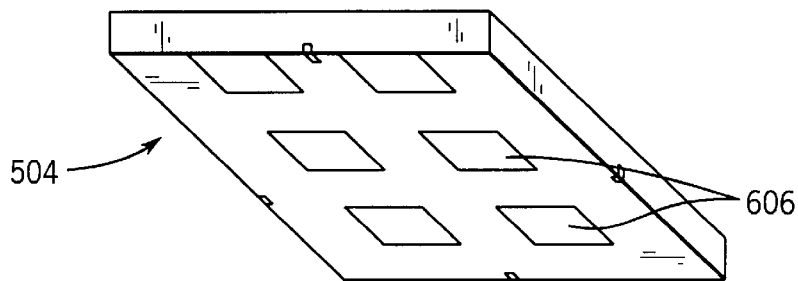
FIG. 10A is a representation of the metalization on a PTC portion of a temperature compensated layered electrode.
Figure 10B:
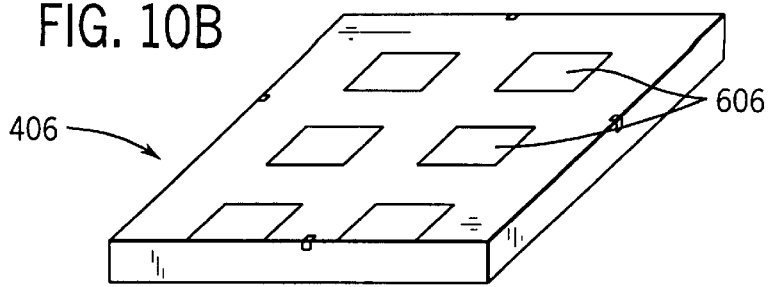
FIG. 10B is a representation of the metalization on a NTC portion of a temperature compensated layered electrode.

FIGS. 10A and 10B show the alignment of the metalized patches 606 of the cathode plate 406 and the tiles 504 of the PTC layer 502. This may be achieved by indexing the patch patterns to the edges of the layers and then aligning the edges of the substrates relative to each other. Indexing of the patch patterns may be achieved by using photo lithographic techniques.

The electrode assembly of this invention may also employ temperature compensated electrodes wherein the cathode plate is covered with metalization patches that are slightly larger than individual PTC tiles 504. Both sides of the PTC tiles 504 are then uniformly metalized. This allows for easy, low cost, fabrication and alignment. If such a means is employed, however, the size of the metalization patches is preferably no larger that the size of the discharge gap between the bottom of the cathode plate and the top of the anode plate.

This embodiment of the electrode assembly of the present invention has been constructed such that the cathode plate metalization patches 506 are slightly larger than 1.3×1.3 cm, and are separated by non-metalized regions no more than 0.1 cm wide. The metalization patches 506 form a 3×11 array so that the assembly uses 33 PTC tiles 504.

The embodiments described above are not to be construed as limiting the present invention. Furthermore, the electrode assembly of the present invention may be used in a variety of different types of TE lasers, and different laser configurations, including, but not limited to, the linear and folded ones disclosed in the aforementioned patent.

What is claimed is:

1. An electrode assembly for a laser, said assembly comprising:
   a cathode sub-assembly comprising:
     a cathode plate having a longitudinal length, first and second cathode surfaces and a pair of longitudinal cathode edges extending along said length; and
   an anode sub-assembly comprising:
     an anode plate having a first anode surface opposing said first cathode surface and spaced apart therefrom by a predetermined height; and
     at least one conductive member in electrical connection with said anode plate, said at least one conductive member extending along at least a section of at least one of said longitudinal cathode edges and having an end portion, said end portion spaced apart from said at least one of said longitudinal cathode edges by a predetermined gap having a dimension substantially less than said predetermined height,
     said at least one conductive member and said predetermined gap being configured and dimensioned to permit formation of an electrical arc between said at least one longitudinal cathode edge and said end portion upon initial application of a voltage differential between said cathode and anode plates.

2. The electrode assembly of claim 1 wherein said at least one conductive member comprises a pair of conductive side plates, each extending along said longitudinal length with its respective end portion proximate to a corresponding one of said longitudinal cathode edges, said conductive side plates being removably mounted to said anode plate.

3. The electrode assembly of claim 2 wherein each of said conductive side plates is removably mounted to said anode plate via a support which is fixed to said anode plate, said cathode and anode plates and said conductive side plates with corresponding supports defining a discharge region within said electrode assembly along said longitudinal length.

4. The electrode assembly of claim 2 wherein said cathode plate has first and second transverse cathode edges connecting said first and second longitudinal cathode edges, said electrode assembly further comprising first and second conductive end plates in electrical connection with said anode plate, said first and second conductive end plates extending along at least a section of a corresponding first and second transverse cathode edge, and having an end portion spaced apart therefrom.

5. The electrode assembly of claim 2 wherein said conductive side plates and said first electrode are each formed from NTC material.

6. The electrode assembly of claim 1 wherein said at least one conductive member comprises a first and a second row of spaced apart rods, each row of spaced apart rods extending along said longitudinal length with end portions of said rods within each row proximate to a corresponding one of said longitudinal cathode edges, said rods being removably mounted to said anode plate.

7. The electrode assembly of claim 1 wherein said cathode sub-assembly comprises said cathode plate, a first metalization layer atop said second cathode surface of said cathode plate, a positive temperature coefficient layer atop said first metalization layer, and a metal electrode atop said positive temperature coefficient layer, wherein said cathode plate comprises a negative temperature coefficient material.

8. The electrode assembly of claim 7 further comprising a second metalization layer formed between said positive temperature coefficient layer and said metal electrode.

9. The electrode assembly of claim 7, wherein the first metalization layer comprises an array of spaced apart metalization patches.

10. The electrode assembly of claim 1 wherein said gap dimension is approximately 15–25% percent of said predetermined height.

11. The electrode assembly of claim 10 wherein said gap dimension is within the range of 0.02 to 0.25 inches and said predetermined height is within the range of 0.1 to 1.25 inches.

12. The electrode assembly of claim 1, wherein said at least one conductive material is formed from one of the group consisting of silicon and silicon carbide.

13. A laser comprising:
   a frame;
   an electrode assembly mounted within the frame, said electrode assembly comprising:
     a cathode sub-assembly comprising:
       a cathode plate having a longitudinal length, first and second cathode surfaces and a pair of longitudinal cathode edges extending along said length; and
     an anode sub-assembly comprising:
       an anode plate having a first anode surface opposing said first cathode surface and spaced apart therefrom by a predetermined height; and
       at least one conductive member in electrical connection with said anode plate, said at least one conductive member extending along at least a section of at least one of said longitudinal cathode edges and having an end portion, said end portion spaced apart from said at least one of said longitudinal cathode edges by a predetermined gap having a dimension substantially less than said predetermined height,
       said at least one conductive member and said predetermined gap being configured and dimensioned to permit formation of an electrical arc between said at least one longitudinal cathode edge and said end portion upon initial application of a voltage differential between said cathode and anode plates; and
   a lasing medium between said cathode and anode plates.

14. The laser of claim 13, wherein said laser is a pulsed, transversely excited (TE) laser.

15. The laser of claim 13, wherein the lasing medium is one from the group consisting of $CO_2$ and CO, and mixtures thereof.

16. The laser of claim 13, wherein said laser is an excimer laser, and the lasing medium is one from the group consisting of ArF, KrF and XeCl.

* * * * *